United States Patent [19]

Gray

[11] Patent Number: 4,579,795
[45] Date of Patent: * Apr. 1, 1986

[54] HIGH DRAIN BATTERY

[75] Inventor: Richard T. Gray, Levittown, Pa.

[73] Assignee: Rohm and Haas Company, Philadelphia, Pa.

[*] Notice: The portion of the term of this patent subsequent to Apr. 1, 2003 has been disclaimed.

[21] Appl. No.: 194,631

[22] Filed: Oct. 6, 1980

[51] Int. Cl.$^4$ .............................. H01M 10/36
[52] U.S. Cl. .................... 429/194; 429/197; 429/213
[58] Field of Search ............... 429/197, 194, 213

[56] References Cited

U.S. PATENT DOCUMENTS

| | | | |
|---|---|---|---|
| 3,907,597 | 9/1975 | Mellors | 429/197 |
| 4,128,702 | 12/1978 | Okaniwa et al. | 429/213 |
| 4,181,779 | 1/1980 | Teo | 429/199 |
| 4,321,114 | 3/1982 | MacDiarmid et al. | 429/213 |

FOREIGN PATENT DOCUMENTS 1216549  12/1970  United Kingdom ............... 429/213

OTHER PUBLICATIONS

Jozefowicz, Conductivity of High Polymer Compounds in the Solid State, Fast Ion Transport in Solid-State Batteries and Devices, Proceedings of the NATO Sponsored Advanced Study Institute, Belgirate, Italy, pp. 623–636 (1973).

Yoshimura, Molecular Metals, Edited by William E. Hatfield, NATO Conference Series VI: Materials Science, 1978, pp. 471–489.

MacDiarmid et al, Organic Coatings and Plastic Chemistry, vol. 43, 1980, pp. 853–856.

Chen et al, Polyacetylene, $(CH)_x$: Photoelectrochemical Solar Cell, Appl. Phys. Letter 36(1) Jan. 1, 1980, pp. 96–98.

Primary Examiner—Donald L. Walton
Attorney, Agent, or Firm—Marc S. Adler

[57] ABSTRACT

A substantially anhydrous cell comprising an anode, a polyacetylene film or foam cathode, an electrolyte capable of $p$-doping the cathode, and an organic solvent for said electrolyte, said polyacetylene cathode being insoluble in said solvent when said cathode is either undoped or $p$-doped, said solvent being stable to electrochemical decomposition, and said anode and said solvent being substantially inert to one another.

23 Claims, No Drawings

HIGH DRAIN BATTERY

BACKGROUND OF THE INVENTION

This invention relates to a cell. More particularly, this invention relates to a cell having a high drain and an enhanced efficiency measured in watt-hours per pound.

In any battery or cell, the amount of electricity produced is dependent on a number of factors. One of these factors involves the cathode. The cathode is composed of an electronegative material which is absorbed or otherwise associated with an electrically conductive support. Thus, the electric power capable of being produced (watt-hours) from the cell is related to the amount of electronegative material absorbed or otherwise associated with the electrically conductive support.

A factor which influences the current produced by the cell is the electrolyte solvent. The speed of ionic migration in the electrolyte solvent will determine the rate of electrical output. In order to have a high drain cell, an electrolyte solvent should be used which will permit a high rate of ionic migration of the electrolyte ions. Further, it is also important that the electrolyte solvent not leach material from the cathode.

For some electrical applications, such as an electric automobile, because of the weight of the object to be activated by a cell, the watt-hours per pound of cell is a critical factor and the drain rate is also a critical factor. In other electrical applications, the size and configuration of the cell is a dominant factor. Therefore, for many electrical operations the drain rate and watt-hours per pound produced by the cell is important and for other electrical applications, the configuration is also important.

Polyacetylene and p-doped polyacetylene and their methods of preparation are described in the Journal of Polymer Science, Volume 12, pages 11 through 20, Shirakawa, et al (1974); Trans. Faraday Society, Volume 64, pages 823 through 828, Berets, et al (1968); in a paper presented at the Advanced Study Institute on the Physics and Chemistry of Low Dimensional Solids—Tomar, Portugal, Aug. 26–Sept. 7, 1979, and entitled Organic Metals and Semi-conductors: The Chemistry of Polyacetylene, $(CH)_x$, and Its Derivatives, MacDiarmid and Heeger; and in an IBM review paper presented at San Jose, Calif., April 1979, and entitled Organic Metals and Semi-conductors: The Chemistry of Polyacetylene, $(CH)_x$ and Its Derivatives, MacDiarmid and Heeger. The disclosure of these papers are incorporated herein by reference. It is known, from these papers, that polyacetylene is minimally electrically conductive and that the electrical conductivity of polyacetylene may be increased by p-doping.

U.S. Pat. No. 3,907,597 is directed to a non-aqueous cell having an anode such as lithium, a cathode such as fluorinated carbon or copper sulfide, an electrolyte such as lithium perchlorate, and an electrolyte solvent such as sulfolane, or 3-methylsulfolane, plus at least 20% by volume of a cosolvent which is mandatory and which reduces the viscosity of the sulfolane or 3-methylsulfolane. The '597 patent also discloses electrolyte solvents such as propylene carbonate, ethylene carbonate, gamma-butyrolactone, ethylene glycol sulfite, and dioxolane. This patent also teaches, that it is practically impossible to predict in advance how well, if at all, a non-aqueous electrolyte (meaning sulfolane and the other solvents set forth above) will function with a selected anode-cathode couple. The '597 patent further discloses that the parts of one cell (cathode, anode and electrolyte) are not predictably interchangeable with parts of another cell to produce an efficient and workable cell.

It is an object of this invention to provide a cell having a high drain rate.

Another object of this invention is to provide a cell having an enhanced efficiency as measured in watt-hours per pound of cell and a high drain rate.

Other objects and advantages will become apparent from the following more complete description and claims.

DETAILED DESCRIPTION

Broadly this invention comtemplates a substantially anhydrous cell comprising an anode, a polyacetylene film or foam cathode, an electrolyte capable of p-doping the cathode and an organic, solvent for said electrolyte, said polyacetylene cathode being insoluble in said solvent when said cathode is either undoped or p-doped, said solvent being stable to electrochemical decomposition, and said anode and said solvent being substantially inert to one another.

It is now been found that a cell having a solid anode, a p-doped polyacetylene cathode, an electrolyte and an organic solvent for said electrolyte is extremely efficient in that the energy density of said cell, measured in watt-hours per pound, depending on the materials used, is high. Additionally, the drain rate of such cell is high so that a large amount of electrical energy is available on demand. Further, the cell may be a primary cell or a secondary cell (capable of being recharged) and may be fabricated in a variety of shapes, such as a helix, layered, rolled up upon itself, or any other shape.

The anode of the cell is composed of any electropositive material having an oxidation potential equal to or more positive than lead such as cesium, rubidium, potassium, sodium, barium, lithium, strontium, calcium, magnesium, yttrium, scandium, beryllium, aluminum, zirconium, manganese, zinc, iron, lead, and their alloys (e.g. a lithium-aluminum alloy) and the like.

It is preferred, however, to use lithium, or its alloys, as the anode because it is most weight efficient, produces a high voltage and lithium salts tend to be more soluble than other metal salts in the electrolyte solvents.

The cathode is composed of polyacetylene, which, when electrochemically doped, becomes a p-doped polyacetylene. The polyacetylene which is used as the cathode substrate may be in a form such as a film or a foam. The preparation of polyacetylene foams is described in Journal of Polymer Science, Polymer letters Edition, Volume 17, pages 779–786, Wnek et al. (1979). The disclosure of that publication is incorporated herein by reference.

The polyacetylene cathode may be electrochemically p-doped a manner similar to that disclosed in the Journal of the Chemical Society Chemical Communications, #14, page 594, Nigrey et al., July, 1979.

In practicing this invention, a cell may be constructed having a lithium anode, a polyacetylene film or foam cathode and an electrolyte of lithium hexafluorophosphate dissolved in sulfolane. Thereafter, when a current is passed through the cell the polyacetylene is p-doped with hexafluorophosphate ions. In practice, the electrochemical p-doping is continued until the desired charge is obtained, as measured by an ammeter. From the above, it is apparent that it is the electrolyte which is responsible for the p-doping of the polyacetylene.

Alternatively, one may utilize a polyacetylene cathode which has been p-doped prior to assembly in a cell.

The electrolyte used must be soluble in the electrolyte solvent, preferably in an amount of at least 5% by weight of the electrolyte solvent and more preferably at least 20% soluble in said solvent, and even more preferably 40% soluble and most preferably even more than 40% soluble. When the electrolyte used is less than 5% soluble in the electrolyte solvent, the effectiveness of the cell decreases. For example, when the electrolyte used is less than 1% soluble, a minimally effective cell is obtained.

Generally, the greater the solubility of the electrolyte in the solvent, the more efficient will be the cell. Among the electrolytes which may be used are the salts of perchlorates, tetrafluoroborates, hexafluorophosphates, hexafluoroarsenates, hexafluoroantimonates, fluorosulfonates, trifluoromethane sulfonates, and the like.

Although any metal salt may be used which meets the solubility criteria set forth above, it is preferred that the electrolyte salt be a salt of the metal used in the anode. This is particularly desirable when the cell is to be a secondary cell.

The solvent for the electrolyte may be any organic solvent in which the electrolyte is soluble, as aforestated, but one in which the p-doped and undoped polyacetylene is insoluble.

The solvent which is used must be substantially inert to both the cathode and anode, must be capable of dissolving the electrolyte in at least the minimum amounts set forth herein and must be stable to electrochemical decomposition.

The solvents which may be used are sulfones including clyclic sulfones, ethers including cyclic ethers, organic carbonates including cyclic carbonates, esters, lactones, organic sulfites and the like.

Among such organic solvents may be mentioned propylene carbonate, sulfolane, dimethoxyethane, bis (methoxyethyl) ether, dioxane, 3-methylsulfolane, tetrahydrofuran, 2-methyltetrahydrofuran, dioxolane, ethylene carbonate, methyl formate, butyrolactone, dimethyl sulfite, and the like.

The cell is generally assembled under anhydrous conditions to eliminate the deleterious effect of water in connection with the operation of the cell.

The cell itself may be a thin cell, even a paper thin cell, so that a multitude of layers may be disposed one on top of the other and connected to one another in series or in parallel, or, a single length of the cell may be rolled up upon itself or into a helix.

In the examples which follow, watt-hours were calculated according to the formula:

Watt-hours = Voltage × Amp Hours

The value for the voltage was taken to be 3 volts.

Watt-hours/pound is calculated by dividing Watthours by the assumed battery weight given in the examples. The assumed battery weight is based on the amounts of materials necessary for the given weight of polyacetylene present plus a dead weight factor. This is reflected in the total battery weight given in the examples.

GENERAL PROCEDURE

Unless indicated otherwise, the apparatus and procedure used in each one of the examples is as follows. The apparatus used is composed of a shallow dish within which is disposed the electrolyte and the electrolyte solvent to form an electrolyte solution. The anode is suspended in the solution and is attached to a metal conductive support. The cathode is composed of polyacetylene film suspended in the electrolyte solution by means of a hemostat. The entire apparatus is assembled in a dry box. The metal conductive support and the hemostat are connected to a direct current power source through which the anode is negatively charged and the cathode is positively charged. Additionally, the apparatus is connected to a volt meter and an ammeter.

The charging voltage is recorded from the volt meter and the current is recorded from the ammeter. After charging, the cell is then discharged under short-circuit conditions through an ammeter. During discharge, the milliamps-minutes is recorded based on periodic ammeter readings. The watt-hours per pound is then calculated as aforesaid.

In all of the examples, an excess of the anodic material, electrolyte and solvent is used. The term "excess" refers to an amount beyond the amount required for the particular example based on the amount of polyacetylene present.

In order to more fully illustrate the nature of this invention and the manner of practicing the same, the following examples are presented.

EXAMPLE 1

The dry box contains a nitrogen atmosphere. The electrolyte is lithium perchlorate dissolved in propylene carbonate. The metal anode is a piece of sodium pressed upon an aluminum metal conductive support. The cathode is a one-half square inch piece of polyacetylene film. The cell is charged using the polarities indicated above. The system results in a 3.8 volts open circuit voltage, which decays rapidly to 3.3 volts. The initial short circuit current for the one-half square inch piece of polyacetylene film is 20 milli-amps.

EXAMPLE 2

The dry box contains an argon atmosphere. The procedure of Example 1 is repeated except that in Example 2, the polyacetylene film used is 5 milligrams of thermally isomerized transpolyacetylene. The results are expressed in Table I.

TABLE I

| Cycle No. | Charge Conditions | (milliamp-minutes) | Watt-hours per pound (assumed working voltage of 3.0 volts and a battery weight of 11 mg.) |
|---|---|---|---|
| 1 | 5 Volts for 1 hr. | 46.7 | 97 |
| 2 | 5 Volts for 1 hr. and 15 minutes | 47.5 | 99 |
| 3 | 4 Volts overnight | 3.25 | not calculated* |
| 4 | 5 Volts for 50 minutes | 43.2 | 90 |
| 5 | 5 Volts for 1 hr. | low | not calculated* |
| 6 | 5½ Volts for 45 minutes | 42.1 | 87 |
| 7 | 5½ Volts for 1 hr. and ten minutes | 48.7 | 101 |
| 8 | 5½ Volts for 1 hr. and ten minutes | 45.8 | 95 |
| 9 | 5½ Volts for 2 hrs. | 61.7 | 128 |
| 10 | 5¾ Volts for 1 and ¾ hrs. | 57.7 | 120 |
| 11 | 5½ Volts for 1 hr | 41.6 | 86 |
| 12 | 5½ Volts for 2 hrs. | 33.3 | 70 |

TABLE I-continued

| Cycle No. | Charge Conditions | (milliamp-minutes) | Watt-hours per pound (assumed working voltage of 3.0 volts and a battery weight of 11 mg.) |
|---|---|---|---|
| | Film Failed | | |

*It is believed that, for cycles 3 and 5, the charge voltage was insufficient.

EXAMPLE 3

The dry box contains an argon atmosphere. The procedure of Example 1 is repeated. The anode used is lithium. The electrolyte is lithium hexafluorophosphate dissolved in sulfolane. An unweighed small piece of transpolyacetylene film is used and the system is charged at 4 volts. The output after charging is 16.7 milliamp-minutes.

EXAMPLE 4

The procedure of Example 1 is repeated except that the anode is lithium and the dry box contains argon atmosphere. The polyacetylene film used as the cathode is 0.5 square centimeter and weighs 6.5 milligrams. The electrolyte is lithium hexafluorophosphate dissolved in propylene carbonate. The system is charged at 4 volts overnight and is then discharged under short-circuit conditions. A total of 0.706 milliamp hours is obtained. Based on an assumed working voltage of 3.0, this is 2.118 milliwatt hours. The energy density, based on an assumed cell weight of between 10 and 20 milligrams is from 48 watt hours per pound to 96 watt hours per pound.

EXAMPLE 5

The dry box contains a nitrogen atmosphere. In this Example 5, an aluminum cup is used. A piece of sodium, in excess of the amount required, is disposed on the bottom of the aluminum cup. On top of the sodium is disposed a piece of filter paper which is wetted with a solution of lithium hexafluorophosphate in propylene carbonate. On top of the filter paper is disposed a 1.6 square centimeter piece of polyacetylene. On top of the polyacetylene is disposed a carbon brick. A lead from the aluminum cup and from the carbon brick is connected to the power source and subsequently to the ammeter and the volt meter. The system accepts a charge of 10 to 20 milliamps with about 0.5 volt overvoltage. This rate drops as the charge nears completion. The initial short-circuit currents are 200 milliamps (124 milliamps per square centimeter). After standing for three days, the short-circuit currents are 10 to 20 milliamps.

EXAMPLE 6

The dry box contains an argon atmosphere. Two cells are assembled using the following apparatus. In a Plexiglas ® acrylic plastic sleeve having a circular internally threaded top portion, a lower portion having a circular internally smooth wall, a smooth circular shoulder extending at a right angle from the end of the internal smooth wall remote from the threaded portion and a circular orifice downwardly extending from the end of the shoulder opposite the smooth wall is disposed, from bottom to top, a gold plated aluminum anode contact which rests on the shoulder and extends through the orifice. The anode contact has a lead connected to the power source and subsequently to the ammeter and volt meter. On top of the anode contact is a lithium anode. On top of the lithium anode as a separator, is coarse Whatman filter paper. The filter paper is wetted with an electrolyte dissolved in propylene carbonate. On top of the coarse filter paper is the polyacetylene cathode. On top of the cathode is a gold plated aluminum cathode contact which has a lead which is also connected to the power source and subsequently to the ammeter and volt meter. The cathode contact is also threaded to mate with the internal threads of the top portion and is screwed down tightly.

The aforedescribed apparatus is used for two cells. In one cell, a three square centimeter (27 milligram) piece of transpolyacetylene is used and in the other a 3 square centimeter (28 milligram) piece of transpolyacetylene is used. In both instances, the electrolyte is lithium hexafluorophosphate dissolved in propylene carbonate. The two cells are connected in series and are charged simultaneously with 8 volts overnight. Power curves are run on both cells at 83.3 microamps/per square cm. During the first milliamp hour of output, the voltage falls from 3.3 volts to 2.8 volts. For the next 4 milliamp hours, the voltage slowly falls from 2.8 volts to 2.35 volts. The end of life voltage falloff is observed between 5 and 6 milliamp hours output. Both cells behave the same in the experiment.

The open circuit voltage falls from 3.6 volts to 3.13 volts for the first two milliamp hours output and holds constant thereafter. The separator used between the cathode and anode in one of the two cells is three pieces of coarse Whatman filter paper and the short-circuit rate is 10-15 milliamps initially. In the other cell, only one piece of filter paper served as a separator. The short-circuit rates for that cell are 60 to 80 milliamps initially.

EXAMPLE 7

The dry box contains an argon atmosphere. Charge-discharge cycling is performed on two milligrams of polyacetylene film using the apparatus of example one. The surface area of the polyacetylene film is 0.25 cm$^2$. The anode is solid lithium. The electrolyte is lithium hexafluorophosphate dissolved in sulfolane. The short-circuit currents are 8 to 10 milliamps (32-40 milliamps per cm$^2$) The cycling results are as follows:

TABLE II

| Cycle | Charge Conditions | Discharge (milliamp-minutes) |
|---|---|---|
| 1 | 4½ Volts for 10 minutes | 8.75 |
| 2 | 4½ Volts for 15 minutes | 9.5 |
| 3 | 4½ Volts for 15 minutes | 9.35 |
| 4 | 4½ Volts for 30 minutes | 8.2 |
| 5 | 4½ Volts for 12 minutes | 7.85 |
| 6 | 4½ Volts for 10 minutes | 7.8 |
| 7 | 4½ Volts for 30 minutes | 8.5 |
| 8 | 5 Volts for 5 minutes | 8.7 |
| 9 | 5 Volts for 7 minutes | 8.65 |
| 10 | 4½ Volts for 30 minutes | 9.05 |

After the tenth cycle, the apparatus stands in the discharge state for two days. On the third day it is found that the polyacetylene film has lost conductivity.

EXAMPLE 8

The dry box contains an argon atmosphere. Charge-discharge cycling is carried out on 6 milligrams of transpolyactylene film using the apparatus of Example 1. The anode is lithium. The electrolyte is lithium tetrafluoroborate dissolved in propylene carbonate. The results are set forth in Table III.

TABLE III

| Cycle | Charge Conditions | Discharge (milliamp-minutes) |
| --- | --- | --- |
| 1 | 4 Volts for ¼ hr. | 37.2 |
| 2 | 4 Volts for ½ hr. | 34.4 |
| 3 | 4 Volts for 1 hr. | 30.0 |
| 4 | 4 Volts for 1⅜ hrs. | 29.8 |

The film, after the fourth cycle, is determined to be losing conductivity and the amount of conductivity lost is considered excessive for continuation of the cycling beyond the fourth cycle.

EXAMPLE 9

The dry box, in each instance, contains an argon atmosphere. Several cells are constructed following the procedure set forth in Example 1 except that the anode is varied. The anodes used are aluminum, magnesium, zinc and calcium.

In each instance a working cell is obtained.

EXAMPLE 10

The dry box, in each instance, contains an argon atmosphere. The procedure of Example 1 is repeated several times except that the electrolyte is varied in each instance. The electrolytes used are lithium perchlorate, lithium fluorosulfonate and lithium hexafluoroarsenate.

In each instance a working cell is obtained.

EXAMPLE 11

The dry box, in each instance, contains an argon atmosphere. The procedure of Example 1 is repeated several times except that the organic solvent is varied. The organic solvents used are dioxane, 3-methylsulfolane, methyl formate, butyrolactone, dimethyl sulfite, dimethoxyethane and ethylene carbonate.

In each instance a working cell is obtained.

The cell of this invention is particularly advantageous because the polyacetylene cathode is totally insoluble in the electrolyte solvent. Self decay of a cell is generally associated with some solubility of the cathode in the electrolyte solvent. Because the polyacetylene cathode is totally insoluble in the electrolyte solvent, self decay of the cell of this invention due to solubility of the cathode in the electrolyte solvent, will not occur.

Additionally, unlike other cells, the cell of the present invention has a cathode wherein the physical state of the polyacetylene matrix of the cathode, in both the charged and discharged state, is constant.

While this invention has been described in terms of certain preferred embodiments and illustrated by means of specific examples, the invention is not to be construed as limited except as set forth in the following claims.

I claim:

1. A substantially anhydrous cell comprising a metal anode, or alloys thereof, a polyacetylene film or foam cathode, an electrolyte capable of p-doping the cathode and an organic solvent for said electrolyte, said polyacetylene cathode being insoluble in said solvent when said cathode is undoped or p-doped, said solvent being stable to electrochemical decomposition, and said anode and said solvent being substantially inert to one another.

2. A substantially anhydrous cell according to claim 1 wherein said anode is lithium.

3. A substantially anhydrous cell according to claim 1 wherein said anode is aluminum.

4. A substantially anhydrous cell according to claim 1 wherein said anode is sodium.

5. A substantially anhydrous cell according to claim 1 wherein said anode is magnesium.

6. A substantially anhydrous cell according to claim 1 wherein said solvent is propylene carbonate.

7. A substantially anhydrous cell according to claim 1 wherein said organic solvent is sulfolane.

8. A substantially anhydrous cell according to claim 1 wherein said organic solvent is 3-methyl sulfolane.

9. A substantially anhydrous cell according to claim 1 wherein said electrolyte is lithium perchlorate.

10. A substantially anhydrous cell according to claim 1 wherein said electrolyte is lithium hexafluorophosphate.

11. A substantially anhydrous cell according to claim 1 wherein said electrolyte is lithium hexafluoroarsenate.

12. A substantially anhydrous cell according to claim 1 wherein said electrolyte is lithium trifluoromethanesulfonate.

13. A substantially anhydrous cell according to claim 1 wherein said electrolyte is lithium fluorosulfonate.

14. A substantially anhydrous cell according to claim 1 wherein said cathode is hexafluoroarsenate doped.

15. A substantially anhydrous cell according to claim 1 wherein said cathode is trifluoromethanesulfonate doped.

16. A substantially anhydrous cell according to claim 1 wherein said cathode is fluorosulfonate doped.

17. A substantially anhydrous cell according to claim 1 wherein said cathode is perchlorate doped.

18. A substantially anhydrous cell according to claim 1 where said anode is lithium and said organic solvent is sulfolane.

19. A substantially anhydrous cell according to claim 1 wherein said anode is lithium, said electrolyte is lithium hexafluoroarsenate and said organic solvent is sulfolane.

20. A substantially anhydrous cell according to claim 1 wherein said anode is lithium, said electrolyte is lithium perchlorate and said organic solvent is propylene carbonate.

21. A substantially anhydrous cell according to claim 1 wherein said solvent is selected from the class consisting of sulfones, ethers, organic carbonates, esters, lactones and organic sulfites.

22. A substantially anhydrous cell according to claim 1 wherein said solvent is selected from the class consisting of sulfolane, 3-methylsulfolane, tetrahydrofuran, 2-methyltetrahydrofuran, dioxolane, dimethoxyethane, bis (methoxyethyl) ether, propylene carbonate, ethylene carbonate, methyl formate, butyrolactone, and dimethyl sulfite.

23. A cell comprising a metal anode, or alloys thereof, a polyacetylene film or foam cathode, an electrolyte capable of p-doping the cathode, and an organic solvent for said electrolyte, said polyacetylene cathode being insoluble in said solvent when said cathode is undoped or p-doped, said solvent being stable to electrochemical decomposition, said anode and said solvent being substantially inert to one another, and said cell being substantially anhydrous.

* * * * *